(12) United States Patent
Cieloch et al.

(10) Patent No.: US 11,821,909 B2
(45) Date of Patent: Nov. 21, 2023

(54) PASSIVE INFRARED DETECTOR WITH A BLIND CHANNEL

(71) Applicant: Carrier Corporation, Palm Beach Gardens, FL (US)

(72) Inventors: Tomasz Cieloch, Pomorskie (PL); Tomasz Lisewski, Gdańsk (PL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 273 days.

(21) Appl. No.: 17/023,935

(22) Filed: Sep. 17, 2020

(65) Prior Publication Data

US 2021/0080482 A1 Mar. 18, 2021

(30) Foreign Application Priority Data

Sep. 17, 2019 (EP) .................................... 19197853

(51) Int. Cl.
*G01P 13/00* (2006.01)
*G01J 5/00* (2022.01)
*G01J 5/10* (2006.01)
*G08B 21/18* (2006.01)

(52) U.S. Cl.
CPC ............ *G01P 13/00* (2013.01); *G01J 5/0025* (2013.01); *G01J 5/10* (2013.01); *G08B 21/18* (2013.01)

(58) Field of Classification Search
CPC ............................... G01J 5/0025; G08B 13/19
USPC ....................................................... 374/122
See application file for complete search history.

(56) References Cited

U.S. PATENT DOCUMENTS

| 4,441,023 A | 4/1984 | Doctor et al. |
| 4,882,491 A | 11/1989 | Tamura et al. |
| 5,703,368 A | 12/1997 | Tomooka et al. |
| 10,242,561 B1 | 3/2019 | Davies et al. |
| 2003/0069002 A1* | 4/2003 | Hunter .................. G08B 21/12 455/567 |
| 2010/0201527 A1* | 8/2010 | Jensen .................. G08B 13/193 340/541 |
| 2010/0283611 A1* | 11/2010 | Smith .................. G08B 13/193 340/568.1 |
| 2013/0271010 A1 | 10/2013 | Cennini et al. |
| 2020/0234551 A1* | 7/2020 | Zhevelev ............ G08B 13/193 |
| 2020/0342748 A1* | 10/2020 | Tournier .......... G08B 13/19695 |

OTHER PUBLICATIONS

European Search Report for Application No. 19197853.5; dated Feb. 14, 2020; 9 Pages.

* cited by examiner

*Primary Examiner* — Fabricio R Murillo Garcia
(74) *Attorney, Agent, or Firm* — CANTOR COLBURN LLP

(57) ABSTRACT

A method for verifying a detection of a motion of a body using a passive infrared sensor (100) includes generating motion data based on a first signal received at a primary detection channel (103*a*, 103*c*), the first signal indicates a possible motion of a body; generating verification data based on a second signal, or absence of second signal, received at a secondary detection channel (103*b*); and verifying that the first signal is a motion of a body based on a comparison of the motion data with the verification data; the primary detection channel (103*a*, 103*c*) is configured to receive a first predetermined range of signals, including at least some infrared signals, and the secondary detection channel (103*b*) is configured to receive a second predetermined range of signals, excluding at least some infrared signals via an infrared blocker (104).

15 Claims, 2 Drawing Sheets

PASSIVE INFRARED DETECTOR WITH A BLIND CHANNEL

FOREIGN PRIORITY

This application claims priority to European Patent Application No. 19197853.5, filed Sep. 17, 2019, and all the benefits accruing therefrom under 35 U.S.C. § 119, the contents of which in its entirety are herein incorporated by reference.

BACKGROUND

It is desirable to reduce the rate of false alarms in security systems. One common example of a false alarm is the triggering of an alarm system by electromagnetic (EM) or mechanical signals from sources other than an intruder.

It is, for example, particularly important to limit false alarms in the systems of premises which are registered with local law enforcement, where law enforcement will attend the premises when the alarm is triggered. If false alarms are too frequent, the premises may be struck off the register and law enforcement will no longer attend the premises when the alarm is triggered.

Many conventional security systems use motion detectors that detect passive infrared (PIR) signals such as those generated by a living being as body heat (infrared energy). By "passive" it is meant that the sensors of the systems detect signals produced by other bodies but do not emit these signals themselves. The sensor of a typical system can detect changes in heat and thus movement of heat sources in the region which it monitors. Passive infrared sensors are widely used sensors in home security systems.

Typical alarm systems, such as household alarms systems, are designed to detect the motion of a human who is an intruder. However, other sources of signals can still trigger these systems, particularly sources of EM waves and mechanical vibrations. This is because although IR detectors are designed to primarily detect infrared (IR) signals, many are also capable of receiving other signals such as EM waves and mechanical vibrations (e.g. sound) and the alarm system may wrongly classify such signals as an intruder, thus triggering a false alarm. For example, passive infrared sensors typically employ pyroelectric detectors to detect motion; these detectors generate a temporary voltage in response to temperature changes which occurs with a change in absorbed IR radiation. When an object in an area monitored by the sensor moves, and this object is a body that generates PIR signals, then this is recorded by the pyroelectric detector as a temperature change in the area in which the body moves. This body may be the body of a living being such as a human or an animal, or it may be some other heat generating body. However, changes that may be detected by the pyroelectric detector can also occur due to the absorption of some other EM waves. Furthermore, some pyroelectric detectors also exhibit piezoelectric characteristics, and so a voltage may be generated when mechanical vibrations impact the detector. As such, both EM waves and mechanical vibrations can result in an event that is wrongly classified as a detected motion of a body.

Conventional methods of dealing with the issue of wrongly classifying signals as a detected motion in PIR systems utilise dual detection. These methods detect a motion using a PIR sensor and then confirm the detected motion with an active sensor. Active sensors utilize active signals such as radar (e.g. microwaves) or ultrasound. By "active" it is meant that sensors emit signals and detect a corresponding reflected signal. For example, sensors may emit radio or microwave pulses and measure the reflection off a moving object in order to detect a presence of an object or a change in its location and thus a movement of the object. Sensors can also emit active infrared signals from an LED following a similar principle.

Such methods are complex and costly to implement due to the additional signal generators, detectors and processing algorithms required.

SUMMARY

The present invention relates to a method for verifying a detected motion of a body and a security system for verifying a detected body using passive infrared sensors. The method and system may determine whether a detected motion is that of an intruder (i.e. a living body). The present invention may be particularly useful for, but not limited to, alarm systems for spaces wherein there are sources of signals such as electromagnetic (EM) and mechanical vibrations (e.g. the slamming of a door or drilling of a wall in the vicinity of the alarm, or sound) that may trigger the alarm system and result in a false alarm as the method and system may distinguish between the infrared signal of a living body and that of a different source, such as a device (e.g. a microwave oven) or external noise such as noise from natural sources of EM signals.

The inventors of the present invention have therefore realised that there is a need in the art for a method and security system that can minimise false alarm whilst not lowering the sensitivity or effectiveness of the system and avoiding the need for more complex equipment and signal processing.

Viewed from a first aspect, the invention provides a method for verifying a detection of a motion of a body using a passive infrared sensor, the method comprising: generating motion data based on a first signal received at a primary detection channel, wherein the first signal indicates a possible motion of a body; generating verification data based on a second signal, or absence of second signal, received at a secondary detection channel; and verifying that the first signal is a motion of a body based on a comparison of the motion data with the verification data; wherein the primary detection channel is configured to receive a first predetermined range of signals, including at least some infrared signals, and the secondary detection channel is configured to receive a second predetermined range of signals, excluding at least some infrared signals via an infrared blocker.

Such a method for verifying a detected motion is simpler than the conventional methods discussed above as there is no complex algorithm and no active signal required. Such a method therefore provides an improved reliability of motion detection and related alarms systems whilst remaining relatively simple and low cost.

In order to meet industry standards, some motion detection systems must be able to detect a wide range of infrared signals. By utilising the above method, it possible to reduce false detections whilst still meeting these wide IR range standards; if the detection range was instead narrowed in order to exclude signals which would otherwise result in a false detection (e.g. microwaves) the wide IR range standard may not be met.

Industry standards also exist in relation to false alarms. In order to meet such industry standards, some motion detection systems must not generate false alarms during exposure to certain radio frequency radiation whilst still meeting minimum motion detection requirements. By utilising the above method, it is possible to reduce false detections whilst still meeting a minimum standard of human motion detection performance requirements; if the detection performance was instead changed in order to exclude signals which would otherwise result in a false detection (e.g. microwaves) the industry standard may not be met.

The infrared blocker may be any component that blocks a portion of infrared signals from reaching the secondary detection channel. For example, the infrared blocker may be a paper or card insert that partially or entirely covers the secondary detection channel.

The step of verifying may comprise determining that the motion data and verification data could not have been generated based on signals from the same source. If the motion data and verification data could not have been generated based on signals from the same source it may be concluded that the signal that generated the motion data is in fact a detected motion (as it was blocked from reaching the secondary detection channel and so did not generate the verification data). However, if the motion data and verification data could have been generated based on signals from the same source then the signal(s) cannot be that of a detected motion as it has passed through the infrared blocker (and so it is not an infrared signal of a moving body).

The first and/or second predetermined ranges of signals may include mechanical signals. Additionally, or alternatively, the first and/or second predetermined ranges of signals may include other electromagnetic signals, such as microwaves. Mechanical signals (e.g. vibrations) and microwave signal are common sources of false detections in motion detection systems. By allowing such signals to be detected by the primary detection channel but not by the secondary detection channel the comparison of the generated motion data with the verification data can easily identify these signals as not being a detected motion and avoid a false detection of motion.

The infrared signals included in the first predetermined range of signals may be the same as the infrared signals excluded in the second predetermined range of signals.

The motion data may be generated based on certain data on the first signal. For example, the motion data may comprise any one or a combination of: a timing at which the signal was received; amplitude of the signal; a frequency of the signal; a wavelength of the signal; and a period of the signal. By including signal characteristics such as these in the motion data, the motion data may comprise a signal profile of the first signal.

The verification data may be generated based on certain data on the second signal, which may comprise any one or a combination of the data outlined above in relation to the motion data and first signal.

By including such data in the motion and verification data, a comparison of the data can be easily carried out in order to verify whether or not the first signal is a motion of a body. For example, if the two signals were respectively detected at the same time and with the same amplitude/frequency, then it could be determined that both signals were produced by the same source and that the first signal therefore cannot be a detected motion of a body (as a signal with that passes through the infrared blocker is not an infrared signal from a moving body).

The primary and secondary detection channels may be positioned adjacent to one another. By having the two channels close to one another, in the event that signals from the same source are detected at both channels, the motion data and verification data will be more similar. For example, the motion data and verification data will show a similar time that the signals were detected and respective signal profiles will be more in phase the closer the channels are to one another. Such an arrangement is advantageous compared with having a separate sensor that is configured to receive the second predetermined range of signals (excluding at least some infrared signals) as the difference in location generates data which is more difficult to compare in order to verify that the first signal is a motion of a body (e.g. motion data and verification data that is out of phase).

The generation of motion data may based on signals received at a plurality of primary detection channels and/or the generation of verification data may be based on signals received at a plurality of secondary detection channels. By generating the respective data based on more than one primary detection channel/secondary detection channel, more accurate data can be produced. For example, a better resolution of signal profiles is achieved which is useful for the comparison of motion data and verification data, Furthermore, higher resolution signal profiles can be compared out of phase, making the location of location less crucial so that the respective detection channels can be separated if it necessary or convenient.

With a plurality of primary detection channels and/or a plurality of secondary detection channels, motion/verification data may be generated based on signals detected at each channel. In this way, the verifying step can comprise multiple comparisons in order to improve reliability. For example, four sets of motion data (detected at four different primary detection channels) may be compared respectively with two different sets of verification data (detected at two different secondary detecting channels).

Furthermore, by employing a plurality of primary detection channels and/or a plurality of secondary detection channels a greater area may be covered by the passive infrared sensor, thus improving its effectiveness.

The method may further comprise a step of classifying a signal detected at the primary and/or secondary detection channel. For example, if it is established that the first signal is not a motion of a body, the first signal could instead be classified as a false detection and furthermore, it may be classified based on the signal characteristics. For example, it could be classified as a mechanical false detection, an EM false detection or a microwave false detection.

The detected motion of a body may be a body of a living being, or as noted above it may be some other body that generates heat, such as a heater or an engine. In some cases the body is that of a human being. In this case, the first predetermined range of signals and second predetermined range of signals may be selected to respectively include and exclude infrared signals produce by a typical human being. For example, a human body at a temperature of 310 K (37° C.) radiates infrared energy with a peak wavelength close to 10 μm.

Viewed from a second aspect, the invention provides a passive infrared motion detection and verification system comprising: a passive infrared sensor including a primary detection channel and a secondary detection channel, wherein the primary detection channel is configured to receive a first predetermined range signals, including at least some infrared signals, and the secondary detection channel is configured to receive a second predetermined range of signals, excluding at least some infrared signals; a data generation unit configured to generate motion data based on a first signal received at the primary detection channel and verification data based on a second signal, or absence of second signal, received at the secondary detection channel; and a verification unit configured to verify that the first signal is a motion of a body based on a comparison of the motion data with the verification data.

The primary and secondary detection channels may be enclosed within a housing that comprises a transparent window for the first and second signal to pass through. The housing may be a single housing enclosing all of the primary/secondary detection channels.

The primary and secondary detection channels may be part of the same PIR sensor. As discussed in relation to the first aspect, the primary and secondary detection channels may be positioned adjacent to one another.

The primary and/or secondary detection channels may comprise pyroelectric detectors. These pyroelectric detectors may be conventional infrared detectors.

The pyroelectric detectors of the primary and secondary channels may similar or identical to one another and the passive infrared sensor may further comprise an infrared blocker at least partially covering the pyroelectric detector of the secondary detection channel.

The infrared blocker may be any component that blocks a portion of infrared signals from reaching the secondary detection channel. For example, the infrared blocker may be a paper or card insert that partially or entirely covers the secondary detection channel. Such an infrared blocker could be fitted to a conventional detection channel, such as the pyroelectric channels discussed above. This allows for existing motion detection systems to be adapted.

As discussed in relation to the first aspect, the system may comprise a plurality of primary detection channels and/or a plurality of secondary detection channels.

The system according to the second aspect may be configured to perform any of the methods according to the first aspect.

The above described method and system for verifying a detected motion of a body using a passive infrared sensor may be employed in alarm systems where it is particularly important to reduce the rate of false alarms. However, it will be appreciated that the present invention can be employed with any infrared motion detection system in order to reduce false detections.

BRIEF DESCRIPTION OF THE DRAWINGS

Certain example embodiments will now be described by way of example only and with reference to the accompanying drawings, in which.

DETAILED DESCRIPTION

Figure 1:
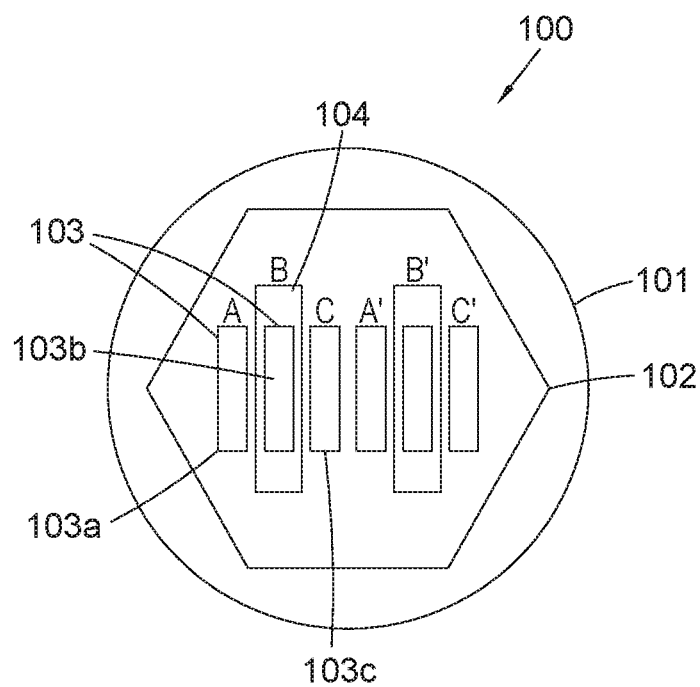
FIG. 1 shows a front view of a passive infrared detector.

With reference, to FIG. 1, a passive infrared (PIR) detector 100 is shown. The PIR detector 100 comprises a housing 101 with a transparent window 102 located in its front side which allows signals to pass from the exterior of the housing to the interior. Such signals include electromagnetic waves (in particular infrared waves) and mechanical vibrations. Mechanical vibrations can also pass through the rest of the housing 101.

The housing 101 encloses a plurality of detection channels 103. In this particular embodiment there are three detection channels 103, each channel comprising two detection elements. All three detection channels 103 are similar pyroelectric detection channels which generate a voltage in response to a change in temperature. Two of the detection channels 103a, 103c are infrared detection channels and are configured to detect a range of EM radiation including infrared radiation from a source outside of the housing 101. The remaining detection channel is a blind detection channel, 103c and is similar to the infrared detection channels 103a, 103c but additionally has a blind 104 placed over its elements that blocks a predetermined frequency or wavelength range of infrared radiation. Here, the blind 104 is constructed from paper or card and blocks a range of infrared radiation corresponding to that which is emitted by a human body (e.g. a wavelength of IR corresponding to a body at a temperature of between 35° C. and 40° C.). It is important to note that in this way, the blind detection channel 103c is able to detect substantially all of the same signals as the four infrared detection channels 103a and 103b apart from the predetermined range of infrared signals that are blocked by the blinds 104.

The detection channels 103 are located adjacent to one another in order to reduce any differences in the signals they receive as result of differences in location. For example, when the detection channels are adjacent to one another, the time at which a certain signal reaches each channel is approximately the same, so the measured signals are in phase.

The PIR sensor 100 monitors a predetermined area such as a room of a household. The transparent window 102 is arranged to allow any signals from this predetermined area to enter the PIR sensor 100 and reach the detection channels 103. In this way, the movement of any infrared emitting body in the predetermined area can be detected by the temperature change at the detection channels 13. However, as a result of this the PIR sensor also receives signals from any other sources in the predetermined area which can be wrongly classified as motions of a body.

The detection channels 103 will now be described in more detail with reference to FIG. 2.

Figure 2:
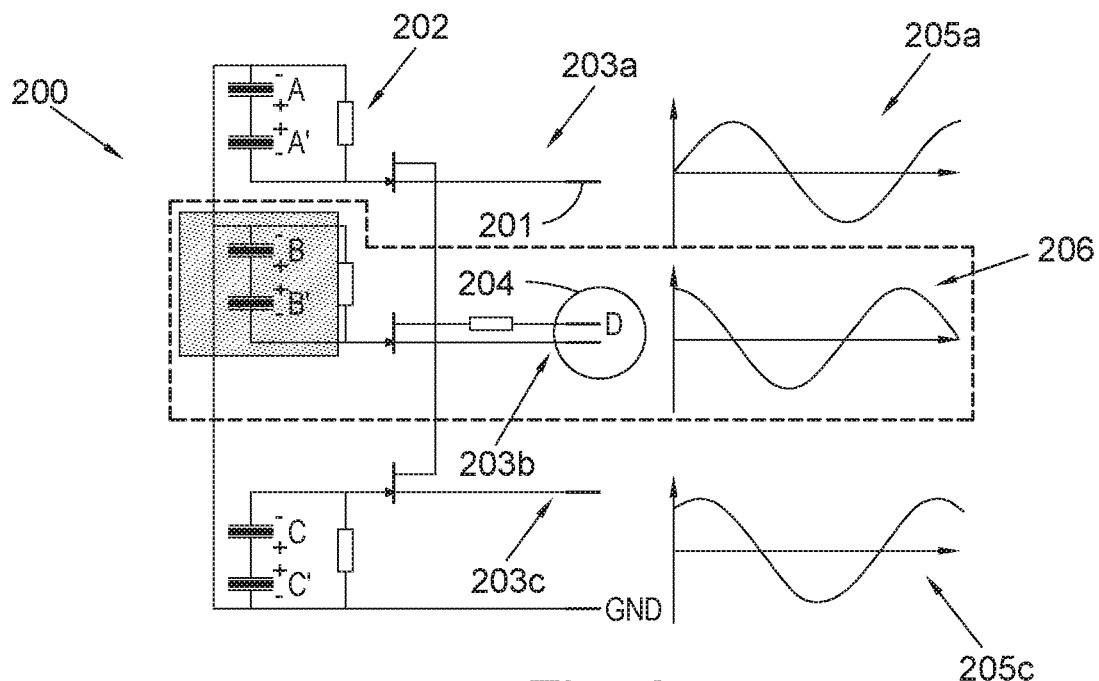
FIG. 2 shows a schematic view of three detection channels of the passive infrared detector of FIG. 1 and respective example data sets generated by each.

FIG. 2 shows detection circuitry 200 comprising three detection channels 203a, 203b, 203c. Only three detection channels are shown in FIG. 2 but it will be appreciated that by including two of each detection channel, the arrangement shown in FIG. 1 can be envisaged. Each detection channel 203c, 203b, 203c comprises a pyroelectric sensor 201 and an amplifier 202. As discussed above, each detection channel comprises two detection elements. One of the detection channels is a blind detection channel 203b in which the pyroelectric sensor is covered by a blind 204, the other two detection channels are (unblinded) infrared detection channels 203a, 203c. The infrared detection channels 203a, 203c and blind detection channel 203b function in the same manner as described above in relation to FIG. 1.

The detection circuitry 20 generates data based on signals received at each of the detection channels 203a, 203b, 203c. The detection circuitry is similar to that of the PYQ 2498 Differential Channel Quad Element Pyro detector, manufactured by Excelitas Technologies. Motion data 205a, 205c is generated based on the signals received at the infrared detection channels 203a, 203c. Such motion data can be based on an infrared signal that is generated by a body and received at these detection channels but could also be based on additional signals that are received at these channels such as the EM or mechanical signals discussed previously. As such, signals received at the infrared detection channels can indicate that a motion of a body has been detected. However, given that the received signals can also come from sources such as EM or mechanical sources, this is only considered to be an indication of a possible movement of a body rather than a definitive detected movement of a body and so verification of the movement is also carried out (this verification is discussed in more detail below).

Verification data 206 is generated based on signals received at the blind detection channel 203b. As the blind detection channel 203b is configured to not receive certain infrared signals, the verification data is instead based on any other signals which can pass through the blind. These could be EM signals or mechanical signals from other sources such as noise.

The motion data 205a, 205c and verification data 206 each comprise data regarding characteristics of the signals received at the respective detection channels. This data includes a signal profile including the amplitude, period, wavelength and frequency of the respective signals received at the detection channels, along with the time at which it was detected.

It will be appreciated that the minimum number of detection channels that is required to generate the above described motion data is one (i.e. one infrared detection channel and one blind channel). However, with an increase in the number of detection channels receiving each signal, the resolution of the motion data and verification data based on the signal can be improved. As such, the above mentioned characteristics associated with the signal profile can be calculated more accurately, thus improving the reliability of the data.

Figure 3:
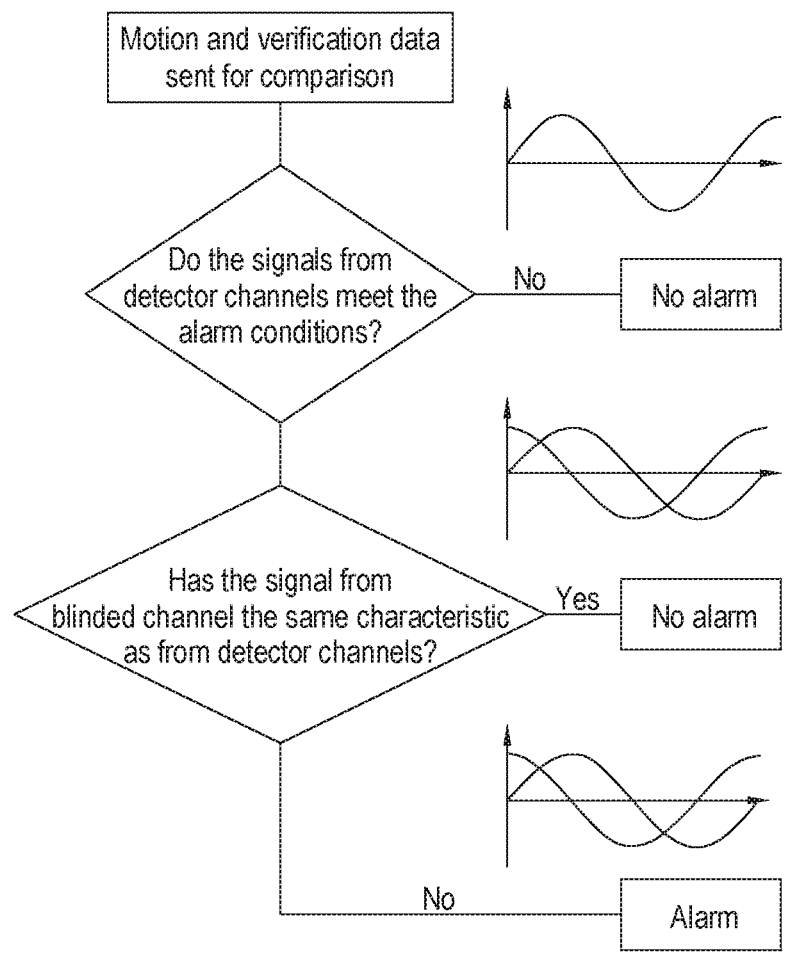
FIG. 3 shows a sequence of steps performable by a system incorporating the passive infrared sensor of FIG. 1 to verify a detected motion and trigger an alarm.

The motion data and verification data is sent to a processor (not shown) which carries out a determination of whether the signal detected at the infrared detection channel(s) 203a, 203c is in fact the motion of a body based on a comparison of the motion data 205a, 205c and verification data 206. This determination process is described in relation FIG. 3 below.

The determination process begins at step 301, where the generated motion data and verification data is sent for determination. At step 302, the motion data is analysed and it is determined whether or not it meets predetermined criteria in order to indicate a possible detected motion of a body. For example, if the motion data indicates that the period of the signal on which it was based was far too short to be a motion of a body (e.g. less than one second), or too low an amplitude, then it is determined that this signal could not be a detected motion and the process terminates at step 303.

If it is determined that the motion data indicates that the signal on which it is based could be a motion of a body the determination proceeds to step 304 where the motion data and verification data are compared in order to verify the possible detected motion of a body.

At step 304, the signal characteristics included in the motion data 205a, 205c and verification data 206 are compared. This comparison includes a comparison of the respective signal profiles including the amplitude, period, wavelength and frequency of the respective signals received at the detection channels, along with the time at which it was detected. Based on this comparison of the motion data and verification data, it is determined whether the signals received at the detection channels and blind channel (on which the motion data and verification data are based) are likely to have come from the same source. For example, if they have a similar amplitude, frequency and/or period. This determination could be made based on the matching of any one or a combination of the signal characteristics within a predetermined threshold (i.e. a certain degree of similarity).

If it is determined that the signals came from the same source, then motion could not have been detected as the blind channel does not receive infrared signals. Therefore, if the motion data and verification data match, it is determined that the signal detected at the detection channel(s) could not be a detected motion and the process terminates at step 305.

If the motion data and verification data do not match it is verified that the signal detected at the detection channel(s) is in fact a detected motion at step 306 and the process proceeds to trigger an alarm indicating a detected motion at step 307.

What is claimed is:

1. A method for verifying a detection of a motion of a body using a passive infrared sensor, the method comprising:
    generating motion data based on a first signal received at a primary detection channel, wherein the primary detection channel is configured to receive a first predetermined range of signals, including at least some infrared signals, wherein the first signal indicates a possible motion of the body;
    generating verification data based on a second signal, or absence of the second signal, received at a secondary detection channel, wherein the secondary detection channel is configured to receive a second predetermined range of signals, excluding at least some infrared signals via an infrared blocker;
    wherein the primary and secondary detection channels are part of the passive infrared sensor; and
    verifying that the first signal indicates the motion of the body based on a comparison of the motion data with the verification data, wherein the verifying comprises determining that the motion data and verification data could not have been generated based on the first and second signals from a common source, as if the motion data and verification data could have been generated based on first and second signals from the common source then the first and second signals cannot be that of a detected motion as the second signal has passed through the infrared blocker.

2. The method as claimed in claim 1, wherein the first and second predetermined ranges of signals include mechanical signals.

3. The method as claimed in claim 1, wherein the first and second predetermined ranges of signals include other electromagnetic signals, preferably wherein the other electromagnetic signals are microwaves.

4. The method as claimed in claim 1, wherein the motion data comprises data on the first signal including any one or a combination of:
    a timing at which the first signal was received;
    an amplitude of the first signal;
    a frequency of the first signal;
    a wavelength of the first signal; and
    a period of the first signal; and
    the verification data comprises data on the second signal including any one or a combination of:
    a timing at which the second signal was received;
    an amplitude of the second signal;
    a frequency of the second signal;
    a wavelength of the second signal; and
    a period of the second signal.

5. The method as claimed in claim 1, wherein the generation of motion data is based on first signals received at each of a plurality of primary detection channels.

6. The method as claimed in claim 1, wherein the at least some infrared signals included in the first predetermined range of signals are the at least some infrared signals excluded in the second predetermined range of signals.

7. The method as claimed in claim 1, wherein the first signal indicating the possible motion of a body is a passive signal.

8. The method as claimed in claim 1, wherein the generation of verification data is based on second signals received at each of a plurality of secondary detection channels.

9. A passive infrared motion detection and verification system comprising:
   a passive infrared sensor including a primary detection channel and a secondary detection channel, wherein the primary detection channel is configured to receive a first predetermined range signals, including at least some first infrared signals, and the secondary detection channel is configured to receive a second predetermined range of signals, excluding at least some second infrared signals via an infrared blocker;
   a data generation unit configured to generate motion data based on a first signal received at the primary detection channel and verification data based on a second signal, or absence of the second signal, received at the secondary detection channel; and
   a verification unit configured to verify that the first signal indicates a motion of a body based on a comparison of the motion data with the verification data, by determining that the motion data and verification data could not have been generated based on first and second signals from a common source, as if the motion data and verification data could have been generated based on the first and second signals from the common source then the first and second signals cannot be that of a detected motion as the second signal has passed through the infrared blocker.

10. The system as claimed in claim 9, wherein the primary and secondary detection channels comprise pyroelectric detectors.

11. The system as claimed in claim 10, wherein the pyroelectric detectors of the primary and secondary channels are similar or identical, and the infrared blocker at least partially covers the pyroelectric detector of the secondary detection channel.

12. The system as claimed in claim 9, wherein the primary and secondary detection channels are adjacent to one another.

13. The system as claimed in claim 9, wherein the system comprises a plurality of primary detection channels and the generation of motion data is based on first signals received at each of the plurality of primary detection channels.

14. The system as claimed in claim 9, wherein the system comprises a plurality of secondary detection channels and the generation of verification data is based on second signals received at each of the plurality of secondary detection channels.

15. A system comprising a processor configured to verify a detection of a motion of a body using a passive infrared sensor, the processor further configured to:
   generate motion data based on a first signal received at a primary detection channel, wherein the primary detection channel is configured to receive a first predetermined range of signals, including at least some infrared signals, wherein the first signal indicates a possible motion of the body;
   generate verification data based on a second signal, or absence of the second signal, received at a secondary detection channel, wherein the secondary detection channel is configured to receive a second predetermined range of signals, excluding at least some infrared signals via an infrared blocker;
   wherein the primary and secondary detection channels are part of the passive infrared sensor; and
   verify that the first signal indicates the motion of the body based on a comparison of the motion data with the verification data, wherein the verifying comprises determining that the motion data and verification data could not have been generated based on first and second signals from a common source, as if the motion data and verification data could have been generated based on the first and second signals from the common source then the first and second signals cannot be that of a detected motion as the second signal has passed through the infrared blocker.

* * * * *